United States Patent

Mizushima et al.

[11] Patent Number: 5,148,300
[45] Date of Patent: Sep. 15, 1992

[54] LIQUID CRYSTAL DISPLAY DEVICE

[75] Inventors: Shigeaki Mizushima, Ikoma; Tatsuo Shimasaki, Uji; Tuneo Nakamura; Noriko Watanabe, both of Nara, all of Japan

[73] Assignee: Sharp Kabushiki Kaisha, Osaka, Japan

[21] Appl. No.: 360,151

[22] Filed: Jun. 1, 1989

[30] Foreign Application Priority Data

Jun. 1, 1988 [JP] Japan .................. 63-134935

[51] Int. Cl.$^5$ ............................................. G02F 1/13
[52] U.S. Cl. ........................................ 359/76; 359/77; 359/78; 359/106; 428/1
[58] Field of Search .............. 350/339 R, 350 S, 341, 350/340, 334, 336, 350 R; 252/299.4; 428/1; 359/75, 76, 77, 78, 106

[56] References Cited

U.S. PATENT DOCUMENTS

| | | | |
|---|---|---|---|
| 3,994,567 | 11/1976 | Matsuo et al. | 428/1 |
| 4,068,923 | 1/1978 | Toida | 428/1 |
| 4,252,414 | 2/1981 | Kinugawa et al. | 350/339 R |
| 4,405,208 | 9/1983 | Shirai | 350/350 S |
| 4,494,824 | 7/1985 | Nakamura et al. | 428/1 |
| 4,593,977 | 6/1986 | Takamatsu | 350/341 |
| 4,759,614 | 7/1988 | Yokokura et al. | 350/350 S |
| 4,879,059 | 11/1989 | Hanyu et al. | 350/350 S |
| 4,958,001 | 9/1990 | Kikuchi et al. | 428/1 |

FOREIGN PATENT DOCUMENTS

| | | | |
|---|---|---|---|
| 0231781 | 8/1987 | European Pat. Off. | 350/334 |
| 0136353 | 10/1979 | Japan | 350/341 |
| 0105224 | 8/1980 | Japan | 350/339 R |
| 0017417 | 2/1983 | Japan | 350/341 |
| 0011724 | 1/1986 | Japan | 428/1 |
| 2159118 | 7/1987 | Japan | 350/350 S |
| 63-226625 | 9/1988 | Japan . | |
| 3231316 | 9/1988 | Japan | 350/339 R |
| 63-249127 | 10/1988 | Japan . | |
| 63-259515 | 10/1988 | Japan . | |
| 0191012 | 10/1989 | Japan | 350/339 R |

*Primary Examiner*—Rolf Hille
*Assistant Examiner*—Tan Ho
*Attorney, Agent, or Firm*—Birch, Stewart, Kolasch & Birch

[57] ABSTRACT

A liquid crystal display device which comprises a pair of oppositely facing electrode substrates formed an alignment film on their surface and a liquid crystal filling the space between said electrode substrates, wherein the alignment film comprises an alicyclic polyimide obtained by polycondensation of a tetracarboxylic acid and a diamine, at least one of which is alicyclic and useful for a twisted nematic liquid crystal display device.

20 Claims, 1 Drawing Sheet

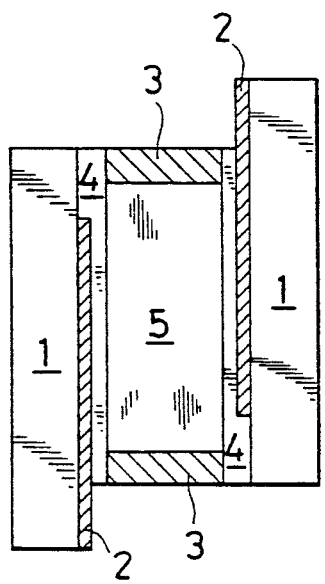
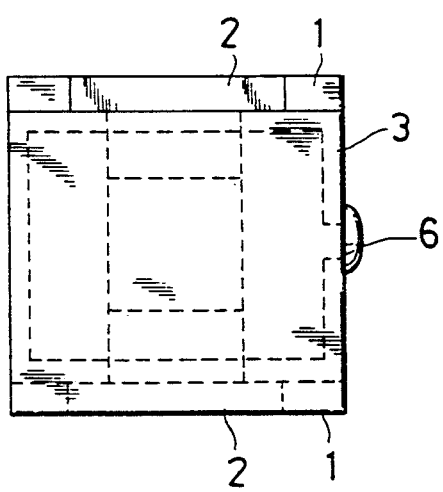
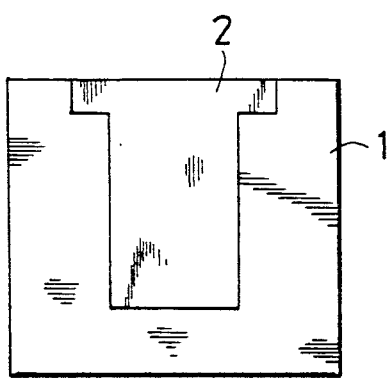
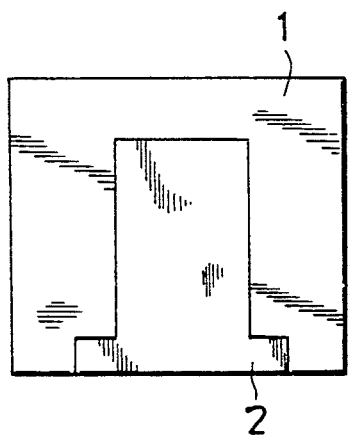
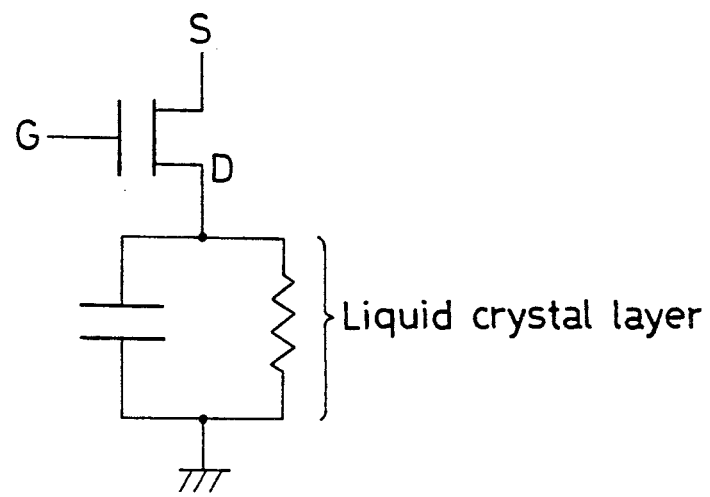

LIQUID CRYSTAL DISPLAY DEVICE

BACKGROUND OF THE INVENTION

1. Field of the Invention

This invention relates to a liquid crystal display device. More particularly, it relates to so-called active drive type liquid crystal display device with an excellent voltage maintaining property, which uses as its liquid crystal cell, a substrate arranged with a switching means such as an MIM element (a metal-insulator-metal field effect element), a field effect type thin film transistor (TFT) element or the like.

2. Description of the Prior Art

As conventional display devices using liquid crystals, twisted nematic liquid crystal display devices have been generally used, wherein a pair of opposed electrode substrates having an alignment film on each surface are positioned so that the aligning directions of the films intersect with each other at a given angle, and liquid crystals are filled between the opposed substrates in the state of twisted orientation. A twisted nematic liquid crystal display device wherein the twist angle of liquid crystals used is set at an angle of 90° or more is also known as a super twisted nematic liquid crystal display device. Further, so-called guest-host type liquid crystal display formed by adding one or more dyes to liquid crystals is also known. Such display modes are referred to as twisted nematic liquid crystal displays hereafter.

As one of such devices, there is a twisted nematic liquid crystal display device for matrix display or TV display, wherein many pixel electrodes (which are usually transparent electrodes) and many MIM elements or TFT elements for switching said electrodes on and off are incorporated in the electrode substrates, which is also known as an active type twisted nematic liquid crystal display device.

On the other hand, various inorganic or organic materials have been used for alignment films formed on the electrode substrates in the above-mentioned liquid crystal display devices. Specifically, wholly aromatic polyimides which are prepared via a polyamic acid derived from an aromatic tetracarboxylic acid such as pyromellitic acid (or its dianhydride) and an aromatic diamine are used as a suitable material for forming the alignment film from the point of view that said polyimides have excellent chemical stability and thermal resistance.

However, In order to achieve a stable and good display in said active type liquid crystal display device, the voltage applied between each of the pixel electrodes is required to be maintained constant for a given period of time without loss. Namely the electric resistance between the pixel electrodes is desired to be as high as possible. For the purpose of evaluating the above property of the devices, for example, an expression of the following ratio is proposed, i.e. the voltage maintaining ratio P=(effective value of drain voltage for 1/60 sec/source voltage). The expression indicates the extent of decrease for 1/60 second of a drain voltage generated by a pulse voltage application to a gate of a TFT in a liquid crystal device driven with a TFT element. When this ratio is utilized, it is desired to be as high as possible.

However, a liquid crystal device using an alignment film of the conventional wholly aromatic polyimide as mentioned above was difficult to exert stable and good display characteristics as an active type liquid crystal display device, because it was low in the voltage maintaining ratio P even if other conditions are appropriate.

The present invention has been made under such circumstances and intends to provide a twisted nematic liquid display device which in particular, has a high voltage maintaining ratio and is very suitable for an active type liquid crystal display device.

SUMMARY OF THE INVENTION

The inventors of the present invention have earnestly investigated from the above point of view and found the fact that a liquid crystal display device remarkably improved in voltage maintaining ratio and being able to exhibit stable and good display can be obtained by use of an alicyclic polyimide having an alicyclic moiety in the main chain for alignment film instead of the conventional wholly aromatic polyimide. Further, such alicyclic polyimides have never been used for an alignment film of liquid crystal display devices because they have been considered to be poor in heat resistance and insulating properties.

Thus, the present invention provides a liquid crystal display device which comprises a pair of oppositely facing electrode substrates formed an alignment film on their surface and liquid crystals filling the space between said electrode substrates, wherein the alignment film is formed from an alicyclic polyimide produced by polycondensation of a tetracarboxylic acid and a diamine, at least one of which is alicyclic.

The liquid crystal display device of the present invention can conduct a stable and good display because of its higher voltage maintaining ratio, and particularly when used as an active type display device, it can also conduct a uniform display in contrast.

BRIEF DESCRIPTION OF THE DRAWINGS

FIGS. 1A and 1B show a diagrammatical side view and diagrammatical plan view of a liquid crystal display device as an embodiment of the present invention, respectively.

FIGS. 2A and 2B are a diagrammatical plan view showing a pattern of a glass substrate used when a liquid crystal display device of the present invention is prepared.

FIG. 3 is a figure of a equivalent circuit used when a voltage maintaining ratio value is measured.

DETAILED DESCRIPTION OF THE PREFERRED EMBODIMENTS

The alignment film of the present invention can be formed by polycondensating a tetracarboxylic acid and a diamine, at least one of which has a alicyclic moiety i.e. is alicyclic, forming a alicyclic polyimide film on a substrate and rubbing the surface of the film.

Specifically, the alicyclic polyimide film can be formed by dissolving the tetracarboxylic acid and the diamine, or polyamic acid or polyimide prepared by polycondensation between the tetracarboxylic acid and the diamine, in a polar solvent such as dimethylacetamid (DMAC), γ-butyrolactone, N-methylpyrrolidone (NMP) or the like, applying the resultant solution to the surface of an a given electrode substrate by a spinner method, a dipping method, or the like and heat-treating the substrate.

The above heat-treatment is suitably conducted in the range of about 150° to 220° C. and preferably at 200° C. ±20° C. The thickness of the finally formed film is generally suitable in the range of about 300 to 1500Å and it can be appropriately adjusted by controlling the amount of coating. The film thickness smaller than 300Å lowers orientation stability and that larger than 1500Å gives unevenness in contrast. Thus, both are undesirable.

The above alicyclic tetracarboxylic acid means compounds which have a carbocyclic moiety free of aromaticity and its derivatives and further have two pairs of carboxyl groups capable of being dehydrated and cyclized in the molecule.

The carbocyclic moiety herein includes those derived from cycloparaffins such as cyclopentene, cyclohexene and the like; cycloolefins such as cyclopentene, cyclohexene and the like; and crosslinked cyclic hydrocarbons such as bicyclo [2.2.2] octane and the like. Their derivatives include compounds having a side chain of $C_{1-4}$ lower alkyl group and polycyclic compounds formed by combining such two carbocyclic compounds directly or via a sulfonyl group, a lower alkylene group or the like.

These alicyclic tetracarboxylic acids are generally used in the form of dianhydride. The specific examples include the compounds of the following formulas (I) to (IV):

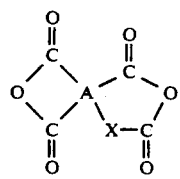

(I)

wherein A represents a $C_{5-8}$ cycloparaffin ring, a $C_{5-8}$-cycloolefin ring or a bicycloparaffin ring and X represents a binding bond or a methylene group;

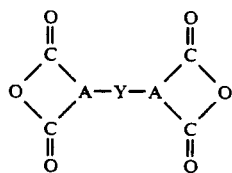

(II)

wherein A is the same as defined above, Y is a binding bond, a sulfonyl group or a lower alkylene group; and

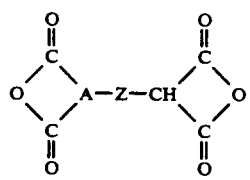

(III)

wherein A is the same as defined above, Z represents a lower alkylene group.

Further, these dianhydride may be used in mixture thereof.

The above alicyclic diamines include those having the structure of carbocyclic moiety as described above, for example compounds of the following formula (IV):

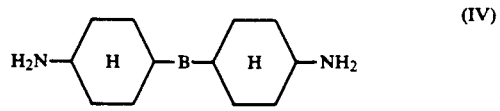

(IV)

wherein B represents an oxygen atom or a lower alkylene group.

If either of the tetracarboxylic acid or the diamine is alicyclic, the other may be a conventional aromatic tetracarboxylic acid (or its anhydride) or a conventional aromatic diamine. Accordingly, it is possible to employ as a combination of materials an alicyclic tetracarboxylic acid and an alicyclic diamine; an alicyclic tetracarboxylic acid and an aromatic diamine; an aromatic tetracarboxylic acid and alicyclic diamine or the like. Among such combinations, the use of a polyimide prepared from an alicyclic tetracarboxylic acid and an alicyclic diamine is preferable to obtain the liquid crystal display device exhibiting a higher voltage maintaining ratio.

Further, the liquid crystal display device of the present invention may be not only an active type twisted nematic liquid crystal display device, but also be used in a conventional liquid crystal display device which conduct a segment display and a super twisted nematic liquid crystal display device. Particularly the active type devices are preferred because the above effect is most effectively exhibited in such devices. These liquid crystal display devices can be prepared by using the specified pair of substrates having the special alignment films such as described previously, filling the space between the substrates with a liquid crystal in a conventional manner and installing appropriately accessories such as a polarized light filter and the like. In the active type device, the electrode substrates which many MIM elements or TFT elements are attached thereto are suitably used, and in particular it is preferable to use the electrode substrates prepared by integrally forming a TFT element comprising amorphous silicon on the surfaces of glass substrates.

In the present invention, the alignment film comprising a film of alicyclic polyimide has an action which increases the voltage maintaining ratio of the twisted nematic liquid crystal display devices. Although the reason why the above action arises is unclear, it is considered that said action arises due to the fact that such polyimide film has less absorptivity and retention of impurity in comparison with conventional polyimide films, so that it has higher electric resistance.

EXAMPLES

Example 1

Measurement of voltage maintaining ratio

The compounds from A-1 to A-7 shown below were used as alicyclic tetracarboxylic acid dianhydrides for preparing of the alignment film. These compounds were obtained from polyimide material manufacturers.

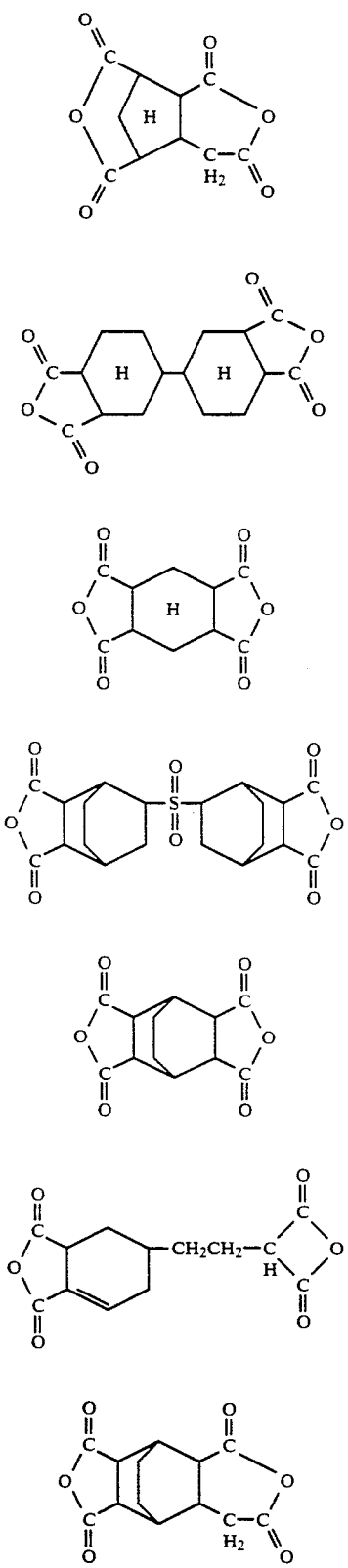
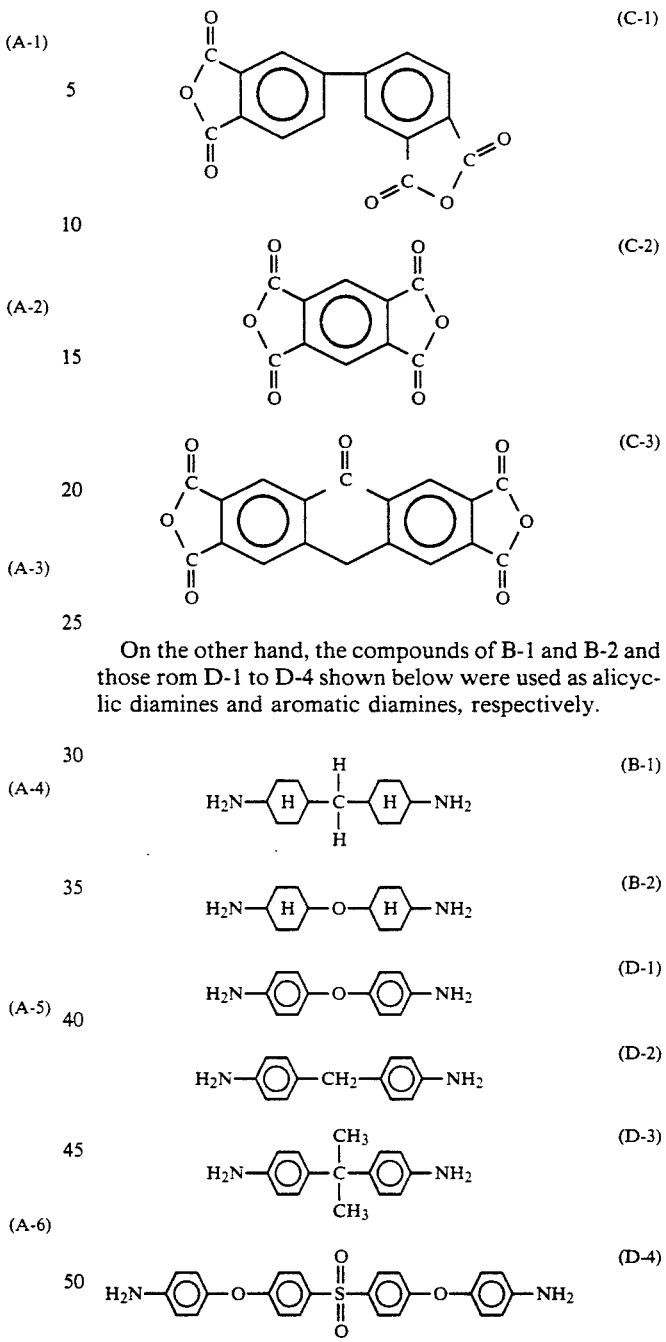

Further, the compounds from C-1 to C-3 shown below were used as aromatic tetracarboxylic acid dianhydrides.

On the other hand, the compounds of B-1 and B-2 and those rom D-1 to D-4 shown below were used as alicyclic diamines and aromatic diamines, respectively.

Each of polymers prepared from a tetracarboxylic dianhydride and a diamine among various acid dianhydrides and diamines mentioned above was dissolved in DMAC, NMP or -butyrolactone to obtain a coating solution containing 8% by weight of the polymer.

The ITO transparent electrode with a predetermined pattern was formed on each surface of two sheets of glass substrates (30×30×1.0mm) by the sputtering method. This pattern is shown in FIGS. 2A and 2B, wherein the numerals of 1 and 2 represent a glass substrate and an ITO transparent electrode, respectively.

A coating film of about 1000±100Å in thickness was formed on the surface of each of substrates by spincoating of a specified coating solution prepared as described above, and it was subjected to the heat treatment for one hour and at 200° C. to be converted into a polyimide film, while comparative test examples were heat-treated for one hour at 250° C. The surface of the polyimide film was rubbed in one direction to obtain an alignment film on the surface. The surfaces of the polyimide films of the two substrates were rubbed in a manner that the rubbing direction of the alignment film of the one substrate is crossed at an angle 90° to that of the other substrate.

Both the substrates (the A patter and the B pattern substrates) were disposed in a manner that their alignment films parallely face each other keeping a given distance with a spacer of a single glass fiber of 5.0 μm in diameter provided between the films and they are jointed at their edges with epoxy thermosetting adhesive.

The nematic liquid crystal (a PCH liquid crystal mixture from Merck & Co., Inc.) was impregnated between both the substrates with a vacuum impregnating method and the impregnating port was sealed with a UV-curing resing to obtain a liquid crystal cell such as showing FIGS. 1A and 1B. In the above figures, the numerals of 3,4,5 and 6 indicate a seal pattern, a polyimide alignment film, a liquid crystal and a sealing compound, respectively.

The voltage maintaining ratio of the above liquid crystal cell was measured by applying a pulse voltage to the cell using the model circuit shown in FIG. 3 in a manner of monitoring of the voltage between the ITO electrodes on both the substrates mentioned above with a digital memory scope and measuring changes of voltage between the ITO electrodes. The measuring condition is as follows. The gate signal with voltage of 10V and pulse width of 30 microseconds and the source signal with frequency of 30 Hz and voltage of ±5 V were input between the gate G and the source S in the model circuit. The change of the drain voltage (VD) is measured to obtain the effective value of the waveform on the scope. The voltage maintaining ratio was calculated from the following expression.

Voltage maintaining ratio=Effective value of drain waveform (V)/5(V)×100(%).

The Measurements of voltage maintaining ratio of the liquid crystal cells having various polyimide alignment films and the materials from which the films were made are shown in Table 1. Said measurements are the average values of original data which have the amount of scatter of about ±2%.

TABLE 1

| Test No. | Tetracarboxylic acid | Diamine | Voltage maintaining ratio (%) |
|---|---|---|---|
| 1 | A-1 | D-1 | 99.1 |
| 2 | A-1 | D-2 | 99.0 |
| 3 | A-1 | D-3 | 98.5 |
| 4 | A-1 | D-4 | 96.4 |
| 5 | A-1 | B-1 | 99.0 |
| 6 | A-1 | B-2 | 99.0 |
| 7 | A-2 | D-1 | 98.4 |
| 8 | A-2 | D-2 | 99.0 |
| 9 | A-2 | D-3 | 98.2 |

TABLE 1-continued

| Test No. | Tetracarboxylic acid | Diamine | Voltage maintaining ratio (%) |
|---|---|---|---|
| 10 | A-2 | D-4 | 95.3 |
| 11 | A-2 | B-1 | 99.1 |
| 12 | A-2 | B-2 | 99.0 |
| 13 | A-3 | D-1 | 99.0 |
| 14 | A-3 | D-2 | 99.0 |
| 15 | A-3 | D-3 | 97.2 |
| 16 | A-3 | D-4 | 95.1 |
| 17 | A-3 | B-1 | 99.0 |
| 18 | A-3 | B-2 | 99.1 |
| 19 | A-4 | D-1 | 97.0 |
| 20 | A-4 | D-2 | 97.2 |
| 21 | A-4 | D-3 | 96.8 |
| 22 | A-4 | D-4 | 94.5 |
| 23 | A-4 | B-1 | 98.1 |
| 24 | A-4 | B-2 | 98.2 |
| 25 | A-5 | D-1 | 96.3 |
| 26 | A-5 | D-2 | 96.1 |
| 27 | A-5 | D-3 | 95.8 |
| 28 | A-5 | D-4 | 93.4 |
| 29 | A-5 | B-1 | 98.4 |
| 30 | A-5 | B-2 | 97.6 |
| 31 | A-6 | D-1 | 96.4 |
| 32 | A-6 | D-2 | 95.2 |
| 33 | A-6 | D-3 | 94.1 |
| 34 | A-6 | D-4 | 92.8 |
| 35 | A-6 | B-1 | 97.1 |
| 36 | A-6 | B-2 | 97.4 |
| 37 | A-7 | D-1 | 97.3 |
| 38 | A-7 | D-2 | 97.1 |
| 39 | A-7 | D-3 | 96.9 |
| 40 | A-7 | D-4 | 94.1 |
| 41 | A-7 | B-1 | 98.1 |
| 42 | A-7 | B-2 | 98.4 |
| 43 | C-1 | B-1 | 93.1 |
| 44 | C-2 | B-1 | 93.3 |
| 45 | C-3 | B-1 | 92.1 |
| 46 | C-1 | B-2 | 91.1 |
| 47 | C-2 | B-2 | 91.0 |
| 48 | C-3 | B-2 | 90.8 |
| A | C-1 | D-1 | 82.4 |
| B | C-2 | D-1 | 78.2 |
| C | C-3 | D-1 | 69.1 |
| D | C-1 | D-4 | 85.9 |
| E | C-2 | D-2 | 72.1 |
| F | C-3 | D-4 | 80.1 |
| G | C-1 | D-3 | 77.7 |

These measurements in the tests in Example 1 did not change, even if the polyimide film prepared under the heat-treating condition of for 1 hour and at 250° C., or for 2 hours and at 180° C. is used in a liquid crystal cell.

Discussion

The liquid crystal cells of the present invention (Test No. 1 to 48), which have the electrode substrates having the alignment film of an alicyclic polyimide containing one or more alicyclic moieties, are found to be remarkably improved in voltage maintaining ratio compared with the liquid crystal cells wherein the alignment film of conventional wholly aromatic polyimide is used (comparative tests A to G).

The results sammarized by classifying the data in Table 1 according to the classes of tetracarboxylic acid and diamine used for the alignment film are shown in Table 2.

TABLE 2

| Class | Series of cycloaliphatic or aromatic group introduced into tetracarboxylic acid | Series of cycloaliphatic or aromatic group introduced into diamine | Corresponding example No. in Table 1 | Voltage maintaining ratio of the device(%) |
|---|---|---|---|---|
| (a) | Cyclohexane | Cyclohexane | 5, 6, 11, 12, 17, 18 | 99.0 |
| (b) | Bicyclooctane | Cyclohexane | 23, 24, 29, 30, 41, 42 | 98.1 |
| (c) | Cyclohexane | Cyclohexane | 35, 36 | 97.3 |
| (d) | Cyclohexane | Benzene | 1–4, 7–10, 13–16 | 97.9 |

TABLE 2-continued

| Class | Series of cycloaliphatic or aromatic group introduced into tetracarboxylic acid | Series of cycloaliphatic or aromatic group introduced into diamine | Corresponding example No. in Table 1 | Voltage maintaining ratio of the device(%) |
| --- | --- | --- | --- | --- |
| (e) | Bicyclooctane | Benzene | 25–28, 37–40 | 96.1 |
| (f) | Cyclohexane | Benzene | 31–34 | 94.6 |
| (g) | Benzene | Cyclohexane | 43–48 | 91.9 |
| (h) | Benzene | Benzene | Comparative tests A to G | 77.9 |

As seen in Table 2, the cells of the class (a) wherein the alignment film is used which is made from tetracarboxylic acid and diamine both having one or more cyclohexane moieties therein, exhibited the best voltage maintaining ratio value of 99.0%. The introduction of one or more alicyclic groups into tetracarboxylic acid exhibited the great effect. The devices of the class (d) wherein one or more cyclohexane groups were introduced into tetracarboxylic acid exhibited the voltage maintaining ratio value of 97.9%, while the cells of the class (h) wherein one or more benzene groups were introduced into both of tetracarboxylic acid and diamine exhibited the value of 77.9%. The alicyclic groups introduced into the compounds exhibited better voltage maintaining ratio in the order of cyclohexane series > bicyclooctane series > cyclohexene series.

Example 2

Combinations of tetracarboxylic acid and diamine, i.e. A-1/D-2, A-2/D-1, A-3/D-1, A-4/D-4, A-2/B-1 and A-7/D-2 corresponding to Test No. 2, 7, 11, 13, 22 and 38 in Example 1, were selected, and the electrode substrates were prepared using the combinations. The field-effect type thin film transistor twisted nematic liquid crystal display devices (TFT-TNLCD) for TV display were then prepared using the above electrode substrates. The above display devices were prepared in the following way.

Firstly, on a surface of one of a pair of glass substrates, an amorphous silicon TFT for every pixel was formed by a conventional process. The number of pixeles was 240×384. On a surface of the other one, R.G.B. color filter pixels were formed by the dyeing method using gelatin and over the pixels, an I.T.O. transparent and electroconductive film was formed by the sputtering method. The subtrates obtained thus each were applied on the surface one of six polyimide materials described above by an offset printing method, and using the resultant a liquid crystal display cell was prepared by a conventional process. The thickness of the film was 600Å and the polyimide film was formed for 1 hour at 200° C. The thickness of the cell was 5.0 μm, and a PCH series liquid crystal mixture from Merck & Co., Inc. was used.

When TV images were displayed using the above liquid crystal cell, voltage was sufficiently applied to each of the pixels to obtain excellent display, but the conventional liquid crystal cell made using a conventional polyimide for the alignment film of the substrate can give only a display with large unevenness of contrast. In particular, when a specific capacitor is not formed in the liquid crystal cell, the above difference in display was larger.

What we claim is:

1. A twisted nematic liquid crystal display device which comprises a pair oppositely facing electrode substrates each formed with an alignment film on the surface thereof and liquid crystals in a state of twisted orientation filling the space between said electrode substrates, wherein the alignment film is formed from an alicyclic or aromatic polyimide obtained by polycondensation of an alicyclic or aromatic tetracarboxylic acid with an alicyclic diamine having the formula (IV):

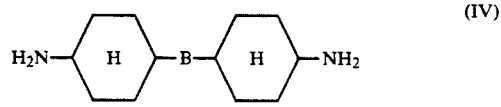

(IV)

wherein B represents an oxygen atom.

2. The device of claim 1 wherein at least one of the tetracarboxylic acid and the diamine is a compound having one or more cyclohexane-, bicyclooctane- or cyclohexane- moieties therein.

3. The device of claim 1 wherein both the tetracarboxylic acid and the diamine are compounds having one or more cyclohexane moieties therein.

4. The device of claim 1 wherein said device is an active drive type liquid crystal display device and wherein said substrates include as a switching means a plurality of metal-insulator-metal or thin film transistor field effect type elements.

5. The device of claim 4 wherein said switching means comprises a plurality of metal-insulator-metal switching elements.

6. The device of claim 4 wherein said switching means comprises a plurality of thin film transistor field effect type elements.

7. The device of claim 1 wherein the alignment film on said substrates is formed from an alicyclic polyimide obtained by conducting polycondensation of a tetracarboxylic acid and a diamine in a polar solvent selected from the group consisting of dimethylacetamide, gamma-butyrolactone and N-methylpyrrolidone; applying the solution to the surface of said substrates; and heat-treating the substrates.

8. The device of claim 7 wherein said heat-treatment is conducted at 180° to 220° C.

9. The device of claim 1 wherein the thickness of said alignment film is about 300 to 1500 angstroms.

10. The device of claim 1 wherein said tetracarboxylic acid is a compound or mixture of compounds selected from the group consisting of compounds of the following formulas (I)–(III):

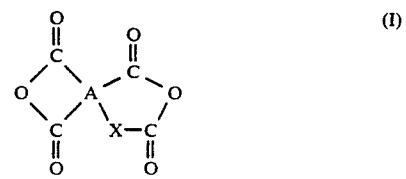

(I)

wherein A represents a $C_{5-8}$ cycloparaffin ring, a $C_{5-8}$-cycloolefin ring or a bicycloparaffin ring and X represents a methylene group;

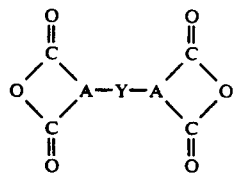 (II)

wherein A is the same as defined above, and Y is a bond, a sulfonyl group or a lower alkylene group; and

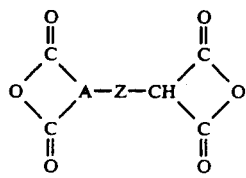 (III)

wherein A is the same as defined above, and Z represents a lower alkylene group.

11. The device of claim 1 wherein said tetracarboxylic acid is a compound selected from the group consisting of:

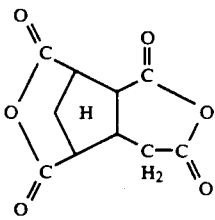

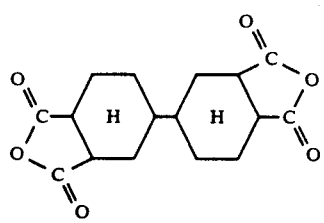

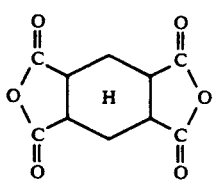

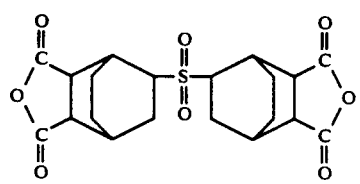

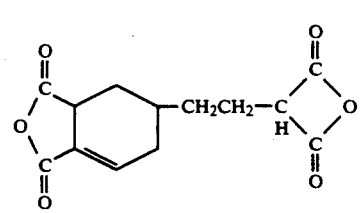

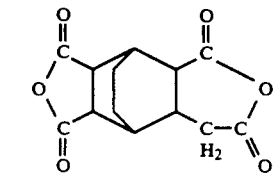

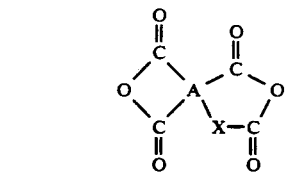

12. A twisted nematic liquid crystal display device which comprises a pair of oppositely facing electrode substrates each formed with an alignment film on the surface thereof and liquid crystals in a state of twisted orientation filling the space between said electrode substrates, wherein the alignment film is formed from an alicyclic polyimide obtained by polycondensation of an alicyclic tetracarboxylic acid having a cyclopentane, bicyclooctane or cyclohexene ring with an aromatic diamine.

13. The device of claim 12 wherein said tetracarboxylic acid is a compound or mixture of compounds selected from the group consisting of compounds of the following formulas (I) - (II):

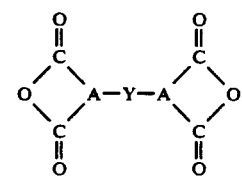

wherein A represents a $C_{5-8}$ cycloparaffin ring, a $C_{5-8}$-cycloolefin ring or a bicycloparaffin ring and X represents a methylene group;

(II)

wherein A is the same as defined above, and Y is a bond, a sulfonyl group or a lower alkylene group; and

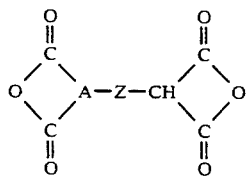

(III)

wherein A is the same as defined above, and Z represents a lower alkylene group.

14. The device of claim 12 wherein said tetracarboxylic acid is a compound selected from the group consisting of:

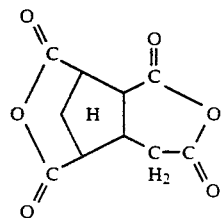

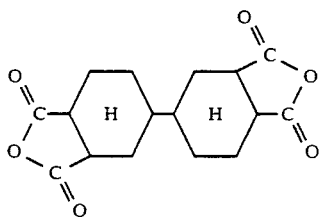

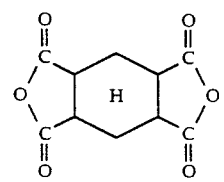

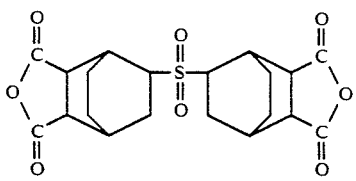

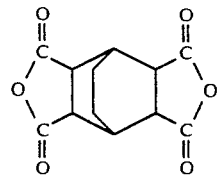

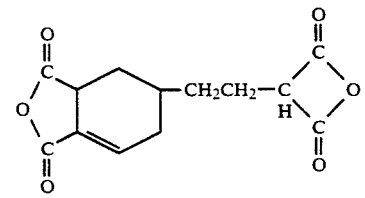

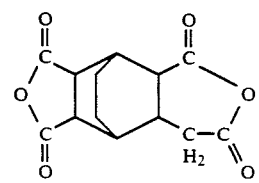

15. The device of claim 12 wherein said device is an active drive type liquid crystal display device and wherein said substrates include as a switching means a plurality of metal-insulator-metal or thin film transistor field effect type elements.

16. The device of claim 15 wherein said switching means comprises a plurality of metal-insulator-metal field effect type elements.

17. The device of claim 15 wherein said switching means comprises a plurality of thin film transistor field effect type elements.

18. The device of claim 15 wherein the alignment film on said substrates is formed from an alicyclic polyimide obtained by conducting polycondensation of a tetracarboxylic acid and a diamine in a polar solvent selected from the group consisting of dimethylacetamide, gamma-butyrolactone and N-methylpyrrolidone; applying the solution to the surface of said substrates; and heat-treating the substrates.

19. The device of claim 18 wherein said heat-treatment is conducted at 180° to 220° C.

20. The device of claim 12 wherein the thickness of said alignment film is about 300 to 1500 angstroms.

* * * * *